United States Patent Office 3,449,502
Patented June 10, 1969

3,449,502
ARTHROPODICIDAL COMPOSITIONS
Kurt Gubler, Riehen, Switzerland, assignor to Geigy Chemical Corporation, Ardsley, N.Y., a corporation of New York
No Drawing. Continuation-in-part of application Ser. No. 434,656, Feb. 23, 1965. This application Oct. 31, 1967, Ser. No. 679,536
Claims priority, application Switzerland, Mar. 13, 1964, 3,300/64
Int. Cl. C07d 49/18; A01n 9/12
U.S. Cl. 424—273                     18 Claims

ABSTRACT OF THE DISCLOSURE

Arthropodicidal composition containing 1-substituted thiomethyl-5 - di(lower)alkylcarbamyloxypyrazoles and acid addition salts thereof as pesticidal components and a method of using them as contact or systemic pesticides in the control of arthropods are disclosed.

CROSS-REFERENCE

This application is a continuation-in-part of pending patent application Ser. No. 434,656, filed Feb. 23, 1965, now U.S. Patent No. 3,395,155.

DETAILED DISCLOSURE

The present invention concerns new pesticides which contain as active ingredients certain arthropodicidal heterocyclic carbamic acid esters and salts thereof; also a method for the control of arthropods with the aid of the new pesticides.

The invention provides in particular novel compositions containing as active ingredients, an arthropodicidally effective amount of a heterocyclic carbamic acid ester of the formula

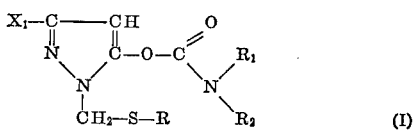

wherein

R represents an optionally substituted aliphatic, alicyclic or aromatic radical, and
$X_1$ represents hydrogen or a lower aliphatic hydrocarbon radical, preferably lower alkyl, and each of $R_1$ and $R_2$ represents a lower aliphatic hydrocarbon radical, preferably lower alkyl, and their addition salts with inorganic or organic acids in combination with a carrier which is acceptable for use with arthropodicides. These active substances are excellently suitable, because of their excellent activity, for the control of pests such as arthropods, e.g., insects and the stages of their development, and also spiders, etc. They can be used both as contact or systemic insecticides and are of great importance in hygiene and veterinary medicine as well as in plant protection.

In the definition of substituents of Formula I, a straight or branched chain alkyl, alkenyl or alkinyl radical is meant by an optionally substituted aliphatic radical represented by R. These radicals have, in particular, 1 to 12 carbon atoms; examples of alkyl radicals are the methyl and ethyl radical, the normal and branched chain propyl, butyl, amyl, hexyl, heptyl, octyl, nonyl, decyl or dodecyl radicals, etc. and examples of alkeny and alkinyl radicals are mainly the allyl, methallyl, the butenyl, propargyl and butinyl radicals. These aliphatic radicals can be mono- or poly-substituted, for example, by halogen, hydroxyl, phenyl and/or alkylthio groups. If R is an alicyclic radical then it is a cycloalkyl or cycloalkenyl radical such as the cyclopentyl or cyclohexyl radical and the cyclopentenyl or cyclohexenyl radical. If R is a homocyclic-aromatic radical, then it is preferably a mononuclear, optionally substituted, ring. Aromatic radicals are advantageously phenyl radicals which can be mono- or poly-substituted by halogen such as chlorine, or bromine, or by alkyl radicals such as methyl, ethyl, propyl or isopropyl.

Alkyl radicals having 1 to 4 carbon atoms such as the methyl, ethyl, propyl, isopropyl and n-butyl radical, are the chief low aliphatic hydrocarbon radicals represented by $X_1$ or $X_2$ or by $R_1$ and $R_2$ in general Formula I.

A preferred class of compounds falling under the general Formula I which is distinguished by particularly high arthropodicidal activity comprises the compounds of the formula

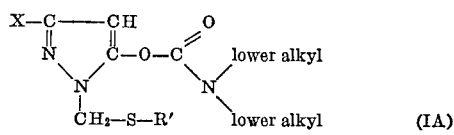

(IA)

and addition salts thereof with an acid, in which formula

R' is a member selected from the group consisting of alkyl of from 1 to 12 carbon atoms, alkenyl of from 2 to 6 carbon atoms, propargyl, cyclopentyl, cyclohexyl, cyclopentenyl, cyclohexenyl, phenyl, lower alkyl-phenyl, chlorophenyl, bromophenyl, chloroalkyl, bromoalkyl, hydroxyalkyl, phenylalkyl, and lower alkylthioalkyl, alkyl in the last five members having from 2 to 4 carbon atoms, and
X is a member selected from the group consisting of hydrogen and lower alkyl.

Of the compounds of Formula IA, those in which X represents lower alkyl and R' represents alkyl of from 1 to 6 carbon atoms are particularly useful in combatting flies and mosquitos.

The heterocyclic carbamic acid esters of general Formula I are produced by processes described in copending patent application Ser. No. 434,656, filed Feb. 23, 1965.

The compounds of the general Formula I produced by the processes described are converted into their salts by reaction with organic or inorganic acids.

Acids used for producing acid addition salts of these compounds are, for instance, mineral acids, e.g. halohydric acids such as hydrochloric acid or hydrobromic acid, nitric acid, phosphoric acid, sulfuric acid, perchloric acid, acetic acid, formic acid, lower alkane-sulfonic acids, e.g., ethane-sulfonic acid, benzoic acid, naphthoic acids aminoacetic acid, butyric acid, tartaric acid, oxalic acid, maleic acid, adipic acid, sebacic acid, higher fatty acid such as stearic acid, oleic acid and coconut oil fatty acid, lactic acid succinic acid, citric acid and others.

The new compounds of general Formula I are stable in water and they dissolve well in organic solvents and some of them also in water.

In testing the action on insects and spiders, it has been found that these active substances have a good to very good contact action as well as being stomach poisons. They also have a very clear systemic action and thus have a particularly broad range of action.

It has been found that the compounds of the general Formula I have an excellent action on insects of the families Muscidae and Cullicidae, e.g., the polyvalent resistant and normally sensitive houseflies (Musca domestica) and midges (Aedes aegyptii, Culex fatigans, Anopheles staphensi), on insects of the families Curculionidae, Bruchidae, Dermestidae, Tenebrionidae and Chrysomelidae, e.g., granary weevils (Sitophilus granaria), bean beetles (*Bruchidius obtectus*), larder beetles (*Dermestes vulpinus*), yellow meal worms (*Tenebrio molitor*), Colorado potato beetles (*Leptinotarsus decemlineata*) and their stages of development, of the Pyralididae family, e.g., Mediterranean flour moths (*Ephestia kühneilla*), the Blattidae family, e.g., German cockroaches (*Phyllodromia germanica*), the Aphididae family, e.g., bean aphids (*Aphis fabae*) and the Pseudococcidae family, e.g., citrus mealybugs (*Planococcus citri*). Tests on bean aphids (*Aphis fabae*) and desert locusts (*Schistocerca gregaria*) indicate that the substancees have an excellent systemic action. Thus compounds of the general Formula I can be used as insecticides in plant protection and also as hygienic and veterinary insecticides.

Testing of the acaricidal activity of the compounds of general Formula I on two-spotted spider mites (*Tetranychus urticae*) showed a very good action, particulary on the adult and larval stages.

It was found that good results were attained on application of the active ingredients in the most various forms for use, for example, as dusts, wettable powders, emulsions or oil solutions, against the insects and spiders mentioned above. The maximal activity of the active ingredients was attained when they were in the form of coatings the adhesion of which to the surface to be protected is very slight. If the pure active substances were applied as fumigant, spray, fog, etc., then, for instance with midges, the action took effect in the very shortest time, whilst a longer time (up to about 1 hour) was necessary with other insects until the action began to take effect.

The range of action of the compounds of general Formula I is widened by admixture with synergists and other auxiliaries having a similar action such as succinic acid dibutyl ester, piperonyl butoxide, DDT active substance, olive oil, peanut oil, phosphoric acid esters, etc. In the same way, the insecticidal action can be considerably broadened and specified by the addition of other insecticides such as phosphoric acid esters, other carbamic acid esters, halogenated hydrocarbons, DDT analogues, pyrethrines and synergists thereof, etc.

To promote contact with the pests, the active ingredients can be used in admixture with attarctants or baits such as sugar and honey or they can be brought on to sugar and similar materials. In addition, the active substances of general Formula I can be mixed and applied with substances having bactericidal, fungicidal or nematocidal properties in order to increase the breadth of the biological activity.

Compositions containing the compounds of Formula I as active ingredients, should normally contain biologically acceptable carriers described in detail further below, which carriers should be conventional ones, acceptable for use with arthropodicides.

The following examples serve to illustrate the invention. Parts are given therein as parts by weight, where not otherwise stated. The temperatures are given in degrees centigrade.

Example 1

12.8 parts of 3-methyl-5-dimethylcarbamyloxypyrazole are dissolved in 200 parts by volume of benzene with the addition of 8 parts of triethylamine. 7.2 parts of chlorodimethyl sulfide are added dropwise to this solution while stirring at room temperature whereupon slight heat is generated. The reaction mixture is refluxed for 5 hours. To work up, the mixture is diluted with a great deal of ether and the ethereal benzene solution is washed twice with a little water. The mixture of solvent is dried and then distilled off in vacuo. The residue is recrystallized from ether/petroleum ether. The pure 1-methylthiomethyl-3-methyl - 5 - N-dimethylcarbamyloxypyrazole melts at 55–58° C.

By dissolving the above final pyrazole product in ethanol and adding thereto sufficient ethanol saturated with hydrogen chloride so that the resulting mixture contains equimolar amounts of the aforesaid pyrazole and HCl, the hydrochloride of 1-methylthiomethyl-3-methyl-5-N-dimethylcarbamyloxypyrazole is obtained.

On using 3-methyl-5-dimethylcarbamyloxypyrazole and equivalent amounts of the chloromethyl thioethers given in column 1 of the following table, the end products given in column 2 are obtained by the method described in this example. Their melting or boiling points are given in column 3.

| Ex. No. | 1 | 2 | 3 |
|---|---|---|---|
| 2 | Chloromethyl-n-propyl thioether. | 1-n-propylthiomethyl-3-methyl-5-dimethylcarbamyloxypyrazole. | B.P. 127–128°/0.0025 mm. Hg |
| 3 | Chloromethyl-isopropyl thioether. | 1-isopropyl-thiomethyl-3-methyl-5-dimethylcarbamyloxypyrazole. | B.P. 128–131°/0.02 mm. Hg. |
| 4 | Chloromethyl-sec.butyl thioether. | 1-sec.butylthiomethyl-3-methyl-5-dimethylcarbamyloxy-pyrazole. | B.P. 136–140°/0.001 mm. Hg. |
| 5 | Chloromethyl-isobutyl thioether. | 1-isobutylthiomethyl-3-methyl-5-dimethylcarbamyloxy-pyrazole. | B.P. 134–135°/0.002 mm. Hg. |
| 6 | Chloromethyl iso-amyl thioether. | 1-isoamylthiomethyl-3-methyl-5-dimethylcarbamyloxy-pyrazole. | B.P. 142–145°/0.008 mm. Hg. |
| 7 | Chloromethyl-n-dodecyl thioether. | 1-n-dodecylthiomethyl-3-methyl-5-dimethylcarbamyloxy-pyrazole. | B.P. 206–211°/0.01 mm. Hg. |
| 8 | Chloromethyl-phenyl thioether. | 1-phenyl-thiomethyl-3-methyl-5-dimethylcarbamyloxy-pyrazole. | M.P. 62–64°. |
| 9 | Chloromethyl-(4-chlorophenyl)thioether. | 1-(4'-chlorophenyl)-thiomethyl-3-methyl-5-dimethylcarbamyloxy-pyrazole. | M.P. 52–55°. |
| 10 | Chloromethyl-(4-methylphenyl) thioether. | 1-(4'-methylphenyl)-thiomethyl-3-methyl-5-dimethylcarbamyloxy-pyrazole. | B.P. 158–165°/0.02 mm. Hg |
| 11 | Chloromethyl-ethyl-thioether. | 1-ethylthiomethyl-3-methyl-5-dimethylcarbamyloxy-pyrazole. | |
| 12 | Chloromethyl-ethyl-thioether. | 1-ethylthiomethyl-3-methyl-5-dimethylcarbamyloxy-pyrazole. | |
| 13 | Chloromethyl-n-butyl thioether. | 1-n-butylthiomethyl-3-methyl-5-dimethylcarbamyloxy-pyrazole. | |
| 14 | Chloromethyl-n-amyl thioether. | 1-n-amyl thiomethyl-3-methyl-5-dimethylcarbamyloxy-pyrazole. | |
| 15 | Chloromethyl-tert-amyl thioether. | 1-tert-amyl thiomethyl-3-methyl-5-dimethylcarbamyloxy-pyrazole. | |
| 16 | Chloromethyl-n-hexyl thioether. | 1-n-hexylthiomethyl-3-methyl-5-dimethylcarbamyloxy-pyrazole. | |
| 17 | Chloromethyl-cyclohexyl thioether. | 1-cyclohexylthiomethyl-3-methyl-5-dimethylcarbamyloxy-pyrazole. | |
| 18 | Chloromethyl-benzyl. | 1-benzylthiomethyl-3-methyl-5-dimethylcarbamyloxy-pyrazole. | |
| 19 | Chloromethyl-propargyl-thioether | 1-proparbylthiomethyl-3-methyl-5-dimethylcarbamyloxy-pyrazole. | |
| 20 | Chloromethyl-cyclopentyl thioether. | 1-cyclopentylthiomethyl-3-methyl-5-dimethylcarbamyloxy-pyrazole. | |
| 21 | Chloromethyl-cyclopentenyl thioether. | 1-cyclopentenylthiomethyl-3-methyl-5-dimethylcarbamyloxy-pyrazole. | |
| 22 | Chloromethyl-cyclohexenyl thioether. | 1-cyclohexenylthiomethyl-3-methyl-5-dimethylcarbamyloxy-pyrazole. | |
| 23 | Chloromethyl-(4-bromophenyl)thioether. | 1-(4-bromophenylthiomethyl)-3-methyl-5-dimethylcarbamyloxy-pyrazole. | |

| Ex. No. | 1 | 2 | 3 |
|---|---|---|---|
| 24 | Chloromethyl-β-hydroxyethyl thioether. | 1-(β-hydroxyethyl-thiomethyl)-3-methyl-5-dimethylcarbamyloxy-pyrazole. | |
| 25 | Chlorination with thionyl chloride of the end product of Example 24. | 1-(β-chloroethyl-thiomethyl)-3-methyl-5-dimethylcarbamyloxy-pyrazole. | |
| 26 | Bromination with phosphorus tribromide of end product of Example 24. | 1-(β-bromoethyl-thiomethyl)-3-methyl-5-dimethylcarbamyloxy-pyrazole. | |
| 27 | Chloromethyl-(β-methylthioethyl) thioether. | 1-(β-methylthioethyl-thiomethyl)-3-methyl-5-dimethylcarbamyloxy-pyrazole. | |

Arthropodicidally effective amounts of active substances according to the invention are at least 0.01 gram, or more advantageously 0.05 gram and more, but preferably not more than 20 grams thereof per square meter of surface to be treated, e.g., of a field or plantation, or of the walls of a room to be kept free from arthropods.

Pest control agents according to the invention are produced by methods known per se by thoroughly mixing and milling the active substances of general Formula I with suitable carriers optionally with the addition of adhesives, dispersing agents or solvents which are inert to the active substances. These pest control agents can be used in the following forms:

Solid forms: Dusts, sprinkling agents, granulates (coated granules, impregnated granules, homogeneous granules)

Water dispersible concentrates of active substances: Wettable powders, pastes, emulsions, Liquid forms: Solutions, and Forms for the production of aerosols, fogs and fumigants.

To produce the solid forms for use (dusts and sprinkling agents, granulates), the active substances are brought on to solid carriers such as talcum, kaolin, bole, loess, chalk, limestone, ground limestone, actaclay, dolomite, diatomaceous earth, precipitated silicic acid, alkaline earth silicates, sodium and potassium aluminum silicates (feldspar and mica), calcium and magnesium sulphates, magnesium oxide, milled plastics, fertilisers such as ammonium sulphate, ammonium phosphates, ammonium nitrate, urea, etc., and also ground vegetable products such as bark dust, sawdust, ground nutshells, bran, cellulose powder, residues of plant extractions, active charcoal, etc. The carriers can be used alone or admixed with each other.

The particle size of the carriers is, for dusts up to about 100μ, for sprinkling agents from about 75μ—0.2 mm. and for granulates from 0.2 mm.—1 mm. (and larger).

As a general rule, the concentrations of active substances in the solid preparations is from 0.5–80% of the weight of the preparation.

To these agents can also be added additives which stabilise the active substance and/or nonionic, anionic and cationic surface active substances which, for example improve the adhesion of the active substances on plants and plant parts (glues, adhesives) and/or attain better wettability (wetting agents) and dispersibility of the active substances. Examples of such surface active substances are as follows: olein plus hydrate of lime, cellulose derivatives of a medium degree of viscosity (methyl cellulose, carboxymethyl cellulose, hydroxyethyl cellulose), galactomannans (guar gum), their anionic and cationic derivatives, polyethylene glycol ethers of mono- and dialkyl phenols (having 5–15 ethyleneoxide radicals per molecule and 8–9 carbon atoms in the alkyl radical, e.g. the commercial products known under the names "Triton," "Igepal," "Terpitol," etc.), condensation products of ethylene oxide/propylene oxide (medium molecular weight of the polyoxypropylene part: 1750; e.g., the commercial products known by the name "Pluronics"), solid, liquid sulphite waste liquor, alkali metal and alkaline earth metal salts thereof, mineral oil and polyethylene glycol ethers (Carbowaxes), fatty alcohol polyethylene glycol ethers (having 5–20 ethylene oxide radicals per molecule and 8–18 carbon atoms in the fatty alcohol moiety, e.g., the commercial products known by the same "Genapol"), dextrins, caseins, their calcium salt, proteins, polyvinyl pyrrolidones, polyvinyl alcohols (e.g. the commercial product known as "Moviol"), condensation products of urea-formaldehyde and also Latex products.

In some cases it is necessary to add to these forms for application, plant, animal and mineral oils as penetrating agents, i.e., agents which help and improve the penetration of the active substance into the plants and parts thereof.

The concentrates of active substance which can be dispersed in water: wettable powders, pastes and emulsion concentrates, are agents which can be diluted with water to any concentration desired for application to plants and parts thereof. They consist of active substance, carrier, additives which stabilise the active substance, surface active substances, protective colloids and antifoaming agents and, optionally, solvents. The concentration of active substance in these agents is 5–80% of the weight of the agent.

Wettable powders and pastes are obtained by mixing and milling the active substances with surface active substances and pulverulent carriers in suitable mixers and milling machines until homogeneity is attained. Carriers are, for example those mentioned in the paragraph dealing with solid forms for application. In some cases it is advantageous to use mixtures of carriers. By surfaces active substances, glues or adhesives, wetting and dispersing agents and protective colloids are to be understood. Of the glues or adhesives already mentioned, because of their properties a number thereof can be used as so-called auxiliary dispersing agents. Other dispersing agents and wetting agents which can be used are:

Condensation products of sulphonated naphthalene and naphthalene derivatives with formaldehyde (e.g., the commercial product "Sellasol"), condensation products of naphthalene and derivatives thereof with phenol and formaldehyde (the commercial products known as "Irgatan"), also aluminium salts of lignin sulphonic acids, further alkylaryl sulphonates, alkali metal salts and alkaline earth metal salts of dibutyl naphthalene sulphonic acid, fatty alcohol sulphates such as salts of sulphated hexadecanols, heptadecanols, octadecanols, octadecenols, the sodium salt of sulphonated hexadecyl glycol ethers (the commercial products known as "Eriopon"), the sodium salt of oleoyl methyl tauride (the commercial products known as "Arkopon"), ditertiary acetylene glycols (the commercial products known as "Surfynol"), dialkyldilauryl ammonium chloride (the commercial product known as "Aliquat"), and fatty acid alkali metal and alkaline earth metal salts. Examples of antifoaming agents are: silicones, Antifoam A, etc.

The active substances are so mixed, milled, sieved and strained with the additives mentioned above that the solid particle size in wettable powders is 20–40μ and in pastes is not more than 3μ. To produce emulsion concentrates and pastes, liquid dispersing agents such as those given in the previous paragraphs, organic solvents and water are used. Examples of solvents are: alcohols, benzene, xylenes, toluene, dimethyl sulphoxide, dimethyl formamide and mineral oil fractions boiling between 120 and 350°. The solvents must be almost without smell, not phytotoxic, inert to the active substances and not easily inflammable.

The forms for application which can be dispersed in water can also contain other additives to increase the stability to light, penetrating agents, antifoaming agents and also synergists.

The wettable powders, pastes and emulsion concentrates are diluted with water to the practical concentrations desired which are between 0.01 and 2% of active substance, calculated on the total weight of the composition. In the composition and concentrations for use described, these forms have good suspendibility which can be further improved, e.g., by the addition of synthetic voluminous silicic acid. The emulsifiable property of the emulsion concentrates is also very good.

In addition, the agents according to the invention can be used in the form of solutions or spray. For this purpose the active substance or substances of general Formula I are dissolved in suitable organic solvents, mixtures of solvents or in water. Higher aliphatic and aromatic hydrocarbons, chlorinated derivatives thereof, alkyl naphthalenes alone or mixed with each other or with water are used as organic solvents. The solutions contain the active substances in a concentration from about 1 to 20% (weight by volume). They are used in the form of spray or mist with suitable spraying or mist blowing equipment.

Aerosols are produced from solutions of the active substances by the addition of propellants; aerosols are particularly suitable for use in the house and garden. Both the solutions and the aerosols can contain additives to increase the adhesion, to give resistance to rain and light, as well as vegetable, animal and mineral oils to improve the adhesion and penetration.

Also, the active substances of general Formula I can be worked up with a combustible substance, e.g., sawdust or paper and a source of oxygen such as potassium chlorate and potassium nitrate, to form a fumigant or fumigant paper.

The application forms described of the agents according to the invention can be mixed very well with other biocidally active compounds or with agents containing such compounds. Thus, to broaden the range of action of the agents according to the present invention, other biocidal active substances such as insecticides, fungicides, bactericides, fungistatics, bacteriostatics or nematocides can be incorporated thereinto. The agents according to the invention can also contain fertilisers, plant hormones, etc.

The following examples illustrate the production of various forms of pest control agents according to the invention. Parts are given therein as parts by weight.

Example I.—Spray (a) 6 parts of 1-methylthiomethyl-3-methyl-5-dimethylcarbamyloxypyrazole are dissolved in 94 parts of water.
(b) 2 parts of 1-n-propylthiomethyl-3-methyl-5-dimethylcarbamyloxypyrazole are dissolved in 10 parts of xylene and 88 parts of petroleum.
(c) 2 parts of 1-phenylthiomethyl-3-methyl-5-dimethylcarbamyloxypyrazole and 3 parts of DDT are dissolved in 95 parts of kerosene.

These solutions are sprayed with pressure pumps. The solution (a) is used for the control of bean aphids on fruit trees and other plants. The solutions (b) and (c) are used for the control of flies and midges in houses storerooms and slaughterhouses.

Example II.—Fumigant (a) 20 parts of 1,-n-propylthiomethyl-3-methyl-5-dimethylcarbamyloxypyrazole are mixed with 61 parts of sawdust which has previously been impregnated with 18.4 parts of potassium nitrate, and the mass is formed into tablets under pressure.
(b) 50 parts of 2-ethylthiomethyl-3-methyl-5-dimethylcarbamyloxypyrazole, 22 parts of sugar, 12 parts of potassium chlorate, 2.4 parts of potassium nitrate and 13.6 parts of sawdust are milled together and thoroughly mixed. The fumigant mass is filled into tins and lit with a wick or a fuse.

Example III.—Fumigant papers (a) Normal filter paper is treated with a 5% potassium nitrate solution. The 1-methylthiomethyl-3-methyl-5-dimethylcarbamyloxypyrazole is drawn onto this filter paper in the form of a 25% acetone solution. The fumigant paper so obtained contains about 30% of active substance. The insecticidal smoke resulting from the tablets and from the fumigant mass is especially suitable for the control of insects in closed spaces.
(b) Fogs.—The active substance as such or with suitable additives which promote evaporation is evaporated by heating, e.g., on an electric plate, in this way killing insects in a closed room.

Example IV.—Dust 1 part of 1-n-butylthiomethyl-3-methyl-5-dimethylcarbamyloxypyrazole is milled as finely as possible with 99 parts of talcum. The adhesion of this powder is increased by the addition of 2 parts of a liquid fatty acid. This dust is used for the control of pests particularly in the household and in storerooms.

Example V.—Sprinkling agent 1 part of 1-methylthiomethyl-3-methyl-5-dimethylcarbamyloxypyrazole is mixed with 99 parts of silicate. This sprinkling agent is suitable everywhere where a finely pulverized material cannot be used because of dust formation.

Example VI.—Wettable powder (a) 25 parts of 1-isopropylthiomethyl-3-methyl-5-dimethylcarbamyloxypyrazole are thoroughly mixed and milled with 2.5 parts of a condensation produce of formaldehyde and sulphonated naphthalene ("Sellasol TD"), 5 parts of a fatty alcohol polyethylene glycol ether ("Genapol C–80"), 25 parts of Celite and 42.5 parts of kaolin. This 25% wettable powder can be diluted with water to any concentration desired.
(b) 40 parts of 1-sec. butylthiomethyl-3-methyl-5-dimethylcarbamyloxypyrazole are thoroughly mixed and milled with 2.5 parts of a sulphonated hexadecyl glycol ether (Eriopon GO), 2.5 parts of a condensation product of sulphonated naphthalene and formaldehyde ("Sellasol TD"), 5 parts of a fatty alcohol polyethylene glycol ether ("Genapol C–080"), 25 parts of light silicic acid and 25 parts of an alkaline earth silicate ("Zeolese 29"). A 40% wettable powder is obtained which can be diluted with water to any concentration desired.

Example VII.—Emulsion 25 parts of 1-tert-amylthiomethyl-3-methyl-5-dimethylcarbamyloxypyrazole are dissolved in a mixture of 50 parts of cyclohexanone and 15 parts of dimethyl formamide and 10 parts of a mixture of an alkylaryl/ethyleneoxy condensation product and of an acid of alkylaryl sulphonic acid are added. This concentrate can be diluted with water to any concentration desired whereupon an emulsion is formed.

Example VIII.—Granulate 87.5 parts of ground limestone (0.4–0.8 mm. particle size) are evenly impregnated with 3.5 parts of polyethylene glycol in a suitable mixer with continuous stirring and rotation. While continuing stirring and rotating, 8 parts of the wettable powder produced according to Example VI are added. This mixture must be rotated or stirred in the mixer until the particles of ground limestone are evenly coated with the wettable powder or the wettable powder has been distributed evenly on the particles of ground limestone. 1 part of light silicic acid is also added to improve the fluidity. The 2% granulate obtained flows freely and can be sprinkled well.

Example IX

Wettable powder prepared as described in Example VI, but with 25 parts of 1-isoamylthiomethyl-3-methyl-5-N, N-dimethylcarbamyloxypyrazole as active ingredient, was diluted with water and the suspension was sprayed firstly onto wooden boards and secondly onto aluminum foil, in sufficient amounts to apply one gram of active substance to each square meter of surface of the substrate.

In order to test effectiveness of the aforesaid active compound, the boards and foils were hung on the wall of a cow stable, and part thereof was removed after on day and another parts after two weeks, respectively, and 20 adults of Aedes aegypti were placed under a Petri dish on each board and foil. The time was determined in which all of the mosquitoes were in dorsal position.

The resuts are given in the table below.

| Duration of exposure to cow stable conditions | Time (minutes) in which all mosquitoes have adopted dorsal position on— | |
| --- | --- | --- |
| | Wooden board | Aluminum foil |
| 1 day | 60 | 16 |
| 14 days | 90 | 30 |

I claim:
1. An arthropodicidal composition consisting essentially of, as an active ingredient, an arthropodicidally effective amount of a compound of the formula

$$\begin{array}{c} X-C\text{———}CH \\ \| \quad\quad \| \\ N \quad\quad C-O-C\overset{O}{\diagdown}\text{lower alkyl} \\ \diagdown N \diagup \quad\quad\quad \diagdown N \diagup \\ | \quad\quad\quad\quad\quad \diagdown \text{lower alkyl} \\ CH_2-S-R' \end{array}$$

wherein
R' is a member selected from the group consisting of alkyl or from 1 to 12 carbon atoms, alkenyl of from 2 to 6 carbon atoms, propargyl, cyclopentyl, cyclohexyl, cyclopentenyl, cyclohexenyl, phenyl, lower alkyl-phenyl, chlorophenyl, bromophenyl, chloroalkyl, bromoalkyl, hydroxyalkyl, phenylalkyl, and lower alkylthioalkyl, alkyl in the last five members being of from 2 to 4 carbon atoms, and
X is a member selected from the group consisting of hydrogen and lower alkyl,
or of an addition salt thereof with an inorganic or organic acid, and a carrier therefore acceptable for use with arthropodicides.

2. An arthropodicidal composition consisting essentially of, as an active ingredient, an arthropodicidally effective amount of a compound of the formula $$\begin{array}{c} X-C\text{———}CH \\ \| \quad\quad \| \\ N \quad\quad C-O-C\overset{O}{\diagdown}\text{lower alkyl} \\ \diagdown N \diagup \quad\quad\quad \diagdown N \diagup \\ | \quad\quad\quad\quad\quad \diagdown \text{lower alkyl} \\ CH_2-S-R' \end{array}$$

wherein
R' is alkyl of from 1 to 6 carbon atoms and X is lower alkyl,
or of an addition salt thereof with an inorganic or organic acid; and a carrier therefor acceptable for use with anthropodicides.

3. An arthropodicidal composition as defined in claim 2, wherein said compound is 1-methylthiomethyl-3-methyl-5-5-N,N-dimethylcarbamyloxypyrazole.

4. An arthropodicidal composition as defined in claim 2, wherein said compound is 1-ethylthiomethyl-3-methyl-5-N,N-dimethylcarbamyloxypyrazole.

5. An arthropodicidal composition as defined in claim 2, wherein said compound is 1-isoamylthiomethyl-3-methyl-5-dimethylcarbamyloxypyrazole.

6. An arthropodicidal composition as defined in claim 2, wherein said compound is 1-isobutylthiomethyl-3-methyl-5-dimethylcarbamyloxypyrazole.

7. An arthropodicidal composition as defined in claim 2, wherein said compound is 1-tert-amylthiomethyl-3-methyl-5-dimethylcarbamyloxypyrazole.

8. An arthropodicidal composition as defined in claim 2, wherein said compound is 1-n-hexylthiomethyl-3-methyl-5-dimethylcarbamyloxypyrazole.

9. A method for controlling arthropods which comprises bringing said arthropods into contact with an arthropodically effective amount of a compound of the formula $$\begin{array}{c} X-C\text{———}CH \\ \| \quad\quad \| \\ N \quad\quad C-O-N\overset{O}{\diagdown}\text{lower alkyl} \\ \diagdown N \diagup \quad\quad\quad \diagdown N \diagup \\ | \quad\quad\quad\quad\quad \diagdown \text{lower alkyl} \\ CH_2-S-R' \end{array}$$

wherein
R' is a member selected from the group consisting of alkyl of from 1 to 12 carbon atoms, alkenyl of from 2 to 6 carbon atoms, propargyl, cyclopentyl, cyclohexyl, cyclopentenyl, cyclohexenyl, phenyl, lower alkyl-phenyl, chlorophenyl, bromophenyl, chloroalkyl, bromoalkyl, hydroxyalkyl,, phenylalkyl, and lower alkylthioalkyl, alkyl in the last five members being of from 2 to 4 carbon atoms, and
X is a member selected from the group consisting of hydrogen and lower alkyl,
or of an addition salt thereof with an inorganic or organic acid.

10. A method for controlling arthropods which comprises bringing said arthropods into contact with an arthropodicidally effective amount of a compound of the formula $$\begin{array}{c} X-C\text{———}CH \\ \| \quad\quad \| \\ N \quad\quad C-O-C\overset{O}{\diagdown}\text{lower alkyl} \\ \diagdown N \diagup \quad\quad\quad \diagdown N \diagup \\ | \quad\quad\quad\quad\quad \diagdown \text{lower alkyl} \\ CH_2-S-R' \end{array}$$

wherein
R' is alkyl of from 1 to 6 carbon atoms, and
X is lower alkyl,
or of an addition salt thereof with an inorganic or organic acid.

11. A method for controlling arthropods as described in claim 10, wherein said arthropods are flies.

12. A method for controlling arthropods as described in claim 10, wherein said arthropods are mosquitoes.

13. A method for controlling arthropods as described in claim 10, wherein said compound is 1-methylthiomethyl-3-methyl-5-N,N-dimethylcarbamyloxypyrazole.

14. A method for controlling arthropods as described in claim 10, wherein said compound is 1-ethylthiomethyl-3-methyl-5-N,N-dimethylcarbamyloxypyrazole.

15. A method for controlling arthropods as described in claim 10, wherein said compound is 1-isoamylthiomethyl-3-methyl-5-dimethylcarbamyloxypyrazole.

16. A method for controlling arthropods as described in claim 10, wherein said compound is 1-isobutylthiomethyl-3-methyl-5-dimethylcarbamyloxypyrazole.

17. A method for controlling arthropods as described in claim 10, wherein said compound is 1-tert-amylthiomethyl-3-methyl-5-dimethylcarbamyloxypyrazole.

18. A method for controlling arthropods as described in claim 10, wherein said compound is 1-n-hexylthiomethyl-3-methyl-5-dimethylcarbamyloxypyrazole.

References Cited

UNITED STATES PATENTS 2,681,915   6/1954   Gysin et al. _____ 260—310

ALBERT T. MEYERS, *Primary Examiner.*

FREDERICK E. WADDELL, *Assistant Examiner.*

U.S. Cl. X.R.

260—310

US 1944 DIV A/1

PO-1050
(5/69)

UNITED STATES PATENT OFFICE
CERTIFICATE OF CORRECTION

Patent No. 3,449,502          Dated June 10, 1969

Inventor(s) Kurt Gubler

It is certified that error appears in the above-identified patent and that said Letters Patent are hereby corrected as shown below:

In column 9, line 32, "or" should read --of--.

In column 9, line 42, "therefore" should read --therefor--.

In column 9, lines 61-62, the name of the compound should be --1-methylthiomethyl-3-methyl-5-N,N-dimethyl-carbamyloxypyrazole--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents